June 9, 1959 R. F. WILLIAMS 2,889,708
GAUGE
Filed Dec. 7, 1956
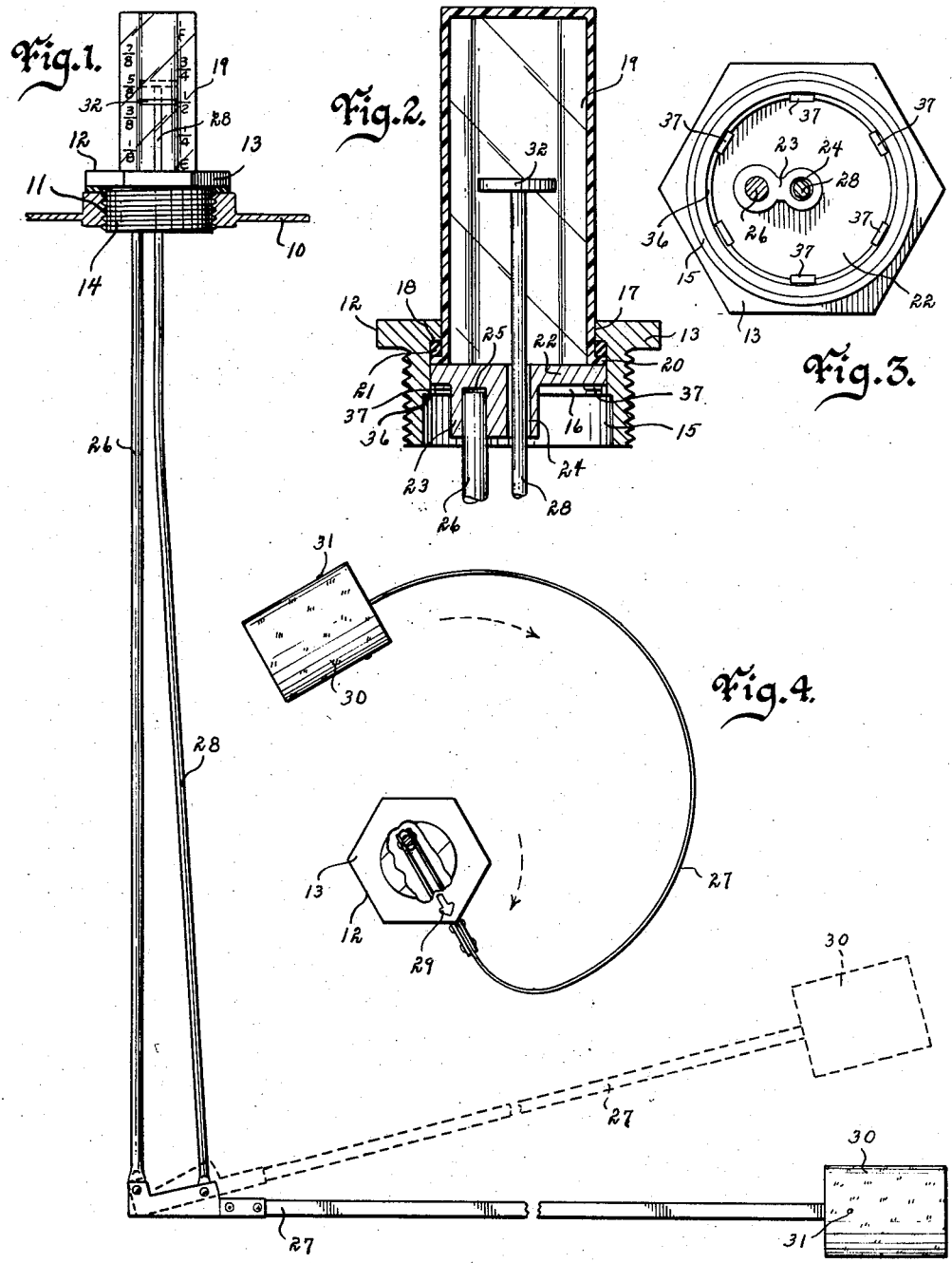
Inventor
Roger F. Williams
by M. Talbert Dick
Attorney
Witness
Edward P. Seeley

United States Patent Office 2,889,708
Patented June 9, 1959

2,889,708

GAUGE

Roger F. Williams, Des Moines, Iowa

Application December 7, 1956, Serial No. 626,858

6 Claims. (Cl. 73—317)

This invention relates to gauges and more particularly to gauges that are inserted and screwed into liquid containers such as tanks.

The use of gauges to indicate the amount of liquids in tanks is very old. Most such tanks have a threaded passageway in their tops for taking a threaded plug or like. The plug is removed and the gauge inserted into the tank and secured by a portion threaded into the threaded opening. Usually the gauge dial or indicator portion protrudes above and beyond the tank for easy reading. Often the indicator is incased for protection against the elements by a transparent housing. However, sun heat often damages such housings and they are subject to being removed and stolen. Another problem is the interference of the tank sides to the rotating float arm during the time the device is being screwed into the threaded tank opening. Also, most tank gauges are complicated and expensive.

Therefore, the principal objects of my invention are to provide a gauge that is economical in manufacture, durable in use, and refined in appearance.

A further object of this invention is to provide a gauge that is substantially theft proof.

A still further object of my invention is to provide a gauge that has a flexibility to permit its easy threading into a tank.

A still further object of this invention is to provide a gauge that is not damaged from sun heat.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a side view of my gauge installed in a tank or like,

Fig. 2 is an enlarged vertical sectional view of the upper portion of my device, Fig. 3 is an enlarged bottom view of the upper portion of my gauge and more fully illustrates its construction, and Fig. 4 is a top plan sectional view of the gauge showing the horizontal flexibility of the float arm.

In these drawings I have used the numeral 10 to designate an ordinary liquid tank or like having the threaded opening 11 in its top. It is to such a tank means that I install my device and which I will now describe in detail.

The numeral 12 generally designates the base plug of my gauge having the nut head portion 13 and the threaded circular flange portion 14 below it, as shown in Fig. 2. This threaded circular flange portion 14 is to be detachably threaded into the tank opening 11, as shown in Fig. 1. The threaded circular flange portion has two communicating bores 15 and 16. The bore 15 is below the bore 16 and of a diameter greater than the diameter of the bore 16. The numeral 17 designates a bore extending through the head portion 13 and communicating with the bore 16. This bore 17 is of a diameter less than that of the bore 16, to provide a shoulder 18 as shown in Fig. 2. The bores 15, 16, and 17 are concentric with each other. The numeral 19 designates an inverted plastic transparent cup of a diameter or slightly less than that of the bore 17 and a bottom rim flange 20 of a diameter greater than that of the bore 17 and only slightly less than that of the diameter of the bore 16. The numeral 21 designates a gasket seal ring embracing the inverted cup and just above the flange 20. The numeral 22 designates a base plate member having downwardly extending lug bearing 23. The numeral 24 designates a centrally located bore extending through the lug bearing and the base plate. The numeral 25 designates a well in the bottom of the lug bearing 23. The numeral 26 designates a downwardly extending rod having its upper end wedged into the well 25 and thus operatively secured to the plate 22. The well 25 is offset from that of the bore 24. The numeral 27 designates a float arm having its inner end hinged to the bottom end of the rod 26. The numeral 28 designates a rod slidably extending through the bore 24 and having its lower end pivoted to the arm 27 at a point offset from the point where the arm is hinged to the rod 26 as shown in Fig. 1. At least a part of the length of the float arm 27 is in the form of a flexible resilient strap with the width vertical. By this construction the float arm may yieldingly flex horizontally and laterally of its width, but will be vertically rigid against flexing. The purpose of this characteristic is that when the member 12 is threaded into the tank 10, the elongated float arm will not interfere with such installation by rigidly striking and engaging certain sides of the tank during the rotation of the part 12. On the other hand, if the float arm does engage an obstruction during the screwing or unscrewing of the base part 12, the arm will yield laterally, as shown in Fig. 4. In use, however, the arm 27 will not flex upwardly but will be rigid vertically and thereby properly function in the rise or fall of a liquid surface level within the tank 10. An arrow marker 29 may be on the top of the part 13 showing the normal direction of the float arm so that when installed the float arm will extend within the tank free of any interfering tank sides. The numeral 30 designates an ordinary cork or like float on the free end of the arm 27. The float may be secured in any suitable maner such as inserting a pin 31 through the float and arm 27. The numeral 32 designates a head or pointer on the upper end of the rod 28. Suitable gauge indicia is imposed on the inverted cup housing 19.

As herebefore indicated, my gauge is a strong, economical and easily assembled one. In fact, one reason for its very low manufacturing cost is due to its method of assembly.

To assemble my gauge, the inverted cup housing is slid upwardly through the top bore 17. This action places the gasket 21 under the shoulder 18 and the flange 20 in the middle bore 16. Next, the plate 22 is inserted into the middle bore 16 and below the flange 20 of the transparent housing. This portion of the assembly places the upper end portion of the rod 28 and its indicator head 32 slidably within the gauge housing 19. The complete assembly is then locked together by the simple method of distorting, by pressure, a punch or like, the shoulder 36 between the bore 15 and bore 16 and which was formed by the bore 15 being of a diameter greater than that of the diameter of the bore 16. The resultant locking lugs are designated by the numeral 37. The result is ear lugs 35 extending below and overlapping the bottom of the plate 22, as shown in Fig. 3. Thus, it will be seen that no assembly threads are needed. The unit will have its proper parts permanetly locked together and these parts can not be easily stolen nor removed. When my gauge is installed in a tank, it will function to determine the liquid contents of the tank and this will be indicated visibly by noting the position of the pointer head relative to the indicia on the housing 19.

By the float arm being flexible it will flex or give with the pressures of liquid being pumped into the tank thereby eliminating the possibility of a damage to the float arm as well as the gauge mechanism. With the liquid pressure terminated the gauge float will immediately return to proper working position.

Some changes may be made in the construction and arrangement of my gauge without departing from the real spirit and purpose of my invention, and it is my intention to cover by my claims, any modified forms of structure or use of mechanical equivalents which may be reasonably included with their scope.

I claim:

1. In a gauge, a one piece base member adapted to be threaded into a tank opening and having a lower bore opening, a middle bore opening and an upper bore opening communicating with each other; said lower bore opening having a diameter greater than that of the diameter of the middle bore opening and said middle bore opening having a diameter greater that that of the diameter of said upper bore opening to provide a shoulder between said upper and middle bore openings and between said lower and middle bore openings, an inverted transparent cup housing having its lower end portion extending downwardly through said upper bore opening, a flange on the bottom of said housing extending laterally in said middle bore opening, a plate member in said middle bore opening below said flange and having a bore, distortions formed on said shoulder between said lower and middle bore openings overlapping said plate, a rod slidably extending upwardly through said bore of said plate and into said housing, a downwardly extending rod secured at its upper end to the underside of said plate, an arm hinged to both said first and second mentioned rods, and a float means on said arm.

2. In a gauge, a one piece base member adapted to be threaded into a tank opening and having a lower bore opening, a middle bore opening and an upper bore opening communicating with each other; said lower bore opening having a diameter greater than that of the diameter of the middle bore opening and said middle bore opening having a diameter greater that that of the diameter of said upper bore opening to provide a shoulder between said upper and middle bore openings and between said lower and middle bore openings, an inverted transparent cup housing having its lower end portion extending downwardly through said upper bore opening, a flange on the bottom of said housing extending laterally in said middle bore opening, a gasket ring between said flange and the shoulder between said upper and middle bore openings, a plate member in said middle bore opening below said flange and having a bore, distortions formed on said shoulder between said lower and middle bore openings overlapping said plate, a rod slidably extending upwardly through said bore of said plate and into said housing, a downwardly extending rod secured at its upper end to the underside of said plate, an arm hinged to both said first and second mentioned rods, and a float means on said arm.

3. In a gauge, a one piece base member adapted to be threaded into a tank opening and having a lower bore opening, a middle bore opening and an upper bore opening communicating with each other; said lower bore opening having a diameter greater than that of the diameter of the middle bore opening and said middle bore opening having a diameter greater that that of the diameter of said upper bore opening to provide a shoulder between said upper and middle bore openings and between said lower and middle bore openings, an inverted transparent cup housing having its lower end portion extending downwardly through said upper bore opening, a flange on the bottom of said housing extending laterally in said middle bore opening, a plate member in said middle bore opening below said flange and having a bore, distortions formed on said shoulder between said lower and middle bore openings overlapping said plate, a rod slidably extending upwardly through said bore of said plate and into said housing, an indicator marker on the upper end of said rod, a downwardly extending rod secured at its upper end to the underside of said plate, an arm hinged to both said first and second mentioned rods, and a float means on said arm.

4. In a gauge, a base member adapted to be threaded into a tank opening and having a lower bore opening, a middle bore opening and an upper bore opening communicating with each other; said lower bore opening having a diameter greater than that of the diameter of the middle bore opening and said middle bore opening having a diameter greater than that of the diameter of said upper bore opening to provide a shoulder between said upper and middle bore openings and between said lower and middle bore openings, an inverted transparent cup housing having its lower end portion extending downwardly through said upper bore opening, a flange on the bottom of said housing extending laterally in said middle bore opening, a plate member in said middle bore opening below said flange and having a bore, distortions formed on said shoulder between said lower and middle bore openings overlapping said plate, a rod slidably extending upwardly through said bore of said plate and into said housing, a downwardly extending rod secured at its upper end to the underside of said plate, an arm having at least a major portion of its length of spring material and hinged to both said first and second mentioned rods, and a float means on said arm.

5. In a gauge, a base member adapted to be threaded into a tank opening and having a lower bore opening, a middle bore opening and an upper bore opening communicating with each other; said lower bore opening having a diameter greater than that of the diameter of the middle bore opening and said middle bore opening having a diameter greater than that of the diameter of said upper bore opening to provide a shoulder between said upper and middle bore openings and between said lower and middle bore openings, an inverted transparent cup housing having its lower end portion extending downwardly through said upper bore opening, a flange on the bottom of said housing extending laterally in said middle bore opening, a plate member in said middle bore opening below said flange and having a bore, distortions formed on said shoulder between said lower and middle bore openings overlapping said plate, a rod slidably extending upwardly through said bore of said plate and into said housing, a downwardly extending rod secured at its upper end to the underside of said plate, an arm having at least a major portion of its length of spring strap material and flexible solely horizontally and hinged to both said first and second mentioned rods, and a float means on said arm.

6. In a gauge, a base member adapted to be threaded into a tank opening and having a lower bore opening, a middle bore opening and an upper bore opening communicating with each other; said lower bore opening having a diameter greater than that of the diameter of the middle bore opening and said middle bore opening having a diameter greater than that of the diameter of said upper bore opening to provide a shoulder between said upper and middle bore openings and between said lower and middle bore openings, an inverted transparent cup housing having its lower end portion extending downwardly through said upper bore opening, a flange on the bottom of said housing extending laterally in said middle bore opening, a plate member in said middle bore opening below said flange and having a bore, distortions formed on said shoulder between said lower and middle bore openings overlapping said plate, a rod slidably extending upwardly through said bore of said plate and into said housing, a downwardly extending rod secured at its upper end to the underside of said plate, an arm having at least a portion of its length flexible solely horizontally and hinged to both said first and second mentioned rods, and a float means on said arm; said arm having at least a major portion of its length resilient and in the form of an elongated spring strap with its width vertical so that it may flex horizontally but not vertically.

References Cited in the file of this patent

UNITED STATES PATENTS

| | | |
|---|---|---|
| 2,255,310 | D'Arcey | Sept. 9, 1941 |
| 2,447,189 | Lerche | Aug. 17, 1948 |

FOREIGN PATENTS

| | | |
|---|---|---|
| 568,704 | France | Dec. 26, 1923 |
| 518,401 | Canada | Dec. 13, 1950 |